L. Fay,

Rail Joint.

No. 4,224.

Reissued Jan. 3. 1871.

Witnesses:
Geoffrey Mathys.
C. Clay Swatkin

Inventor:
Lyman. Fay,
by. B. F. James. his atty.

N. PETERS, PHOTO-LITHOGRAPHER, WASHINGTON, D. C.

UNITED STATES PATENT OFFICE.

LYMAN FAY, OF WORCESTER, MASSACHUSETTS, ASSIGNOR TO JOSEPH M. RICE, OF SAME PLACE, AND DANL. R. PRATT, OF NEW YORK, N. Y.

IMPROVEMENT IN SECURING RAILWAY-RAIL JOINTS.

Specification forming part of Letters Patent No. 35,597, dated June 17, 1862; Reissue No. 4,224, dated January 3, 1871.

*To all whom it may concern:*

Be it known that I, LYMAN FAY, of the city of Worcester and State of Massachusetts, have invented a new and useful Improvement in the Method of Securing the Joints of Railroad-Rails by means of fish-pieces applied thereto; and I do hereby declare the following to be a full, clear, and exact description of the construction and operation of the same, reference being had to the annexed drawings, making a part of this specification.

The nature of my invention consists in the construction and adaptation of splice-pieces or fish-plates to railroad-rail joints by means of the interposition of rubber or other elastic substance between the fish-plate and an outer box, cup, or plate, within which the rubber or other elastic substance is secured, and through all of which bolts are allowed to pass, as well as through the neck of the rail and into a fish-plate on the opposite side of the railroad-rail.

Figure 3:
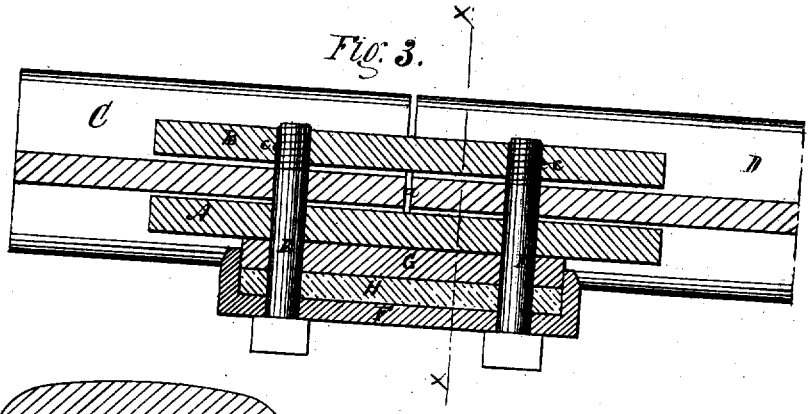
Figure 2:
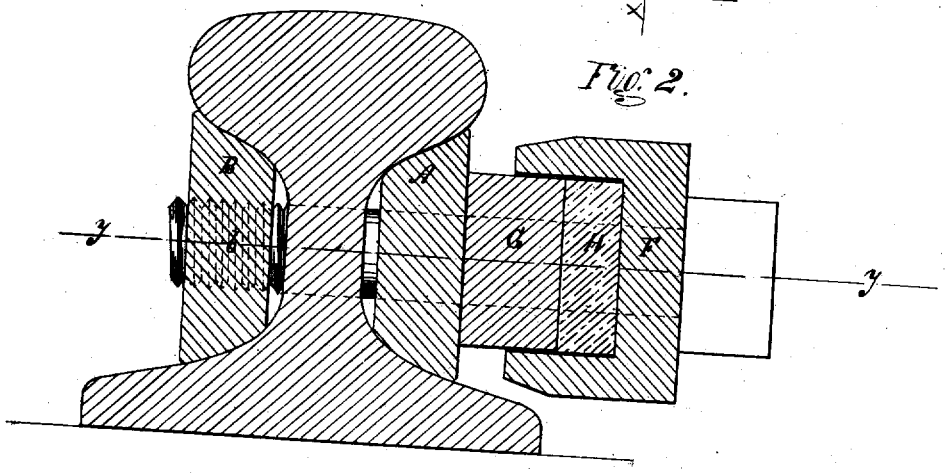
Figure 1:
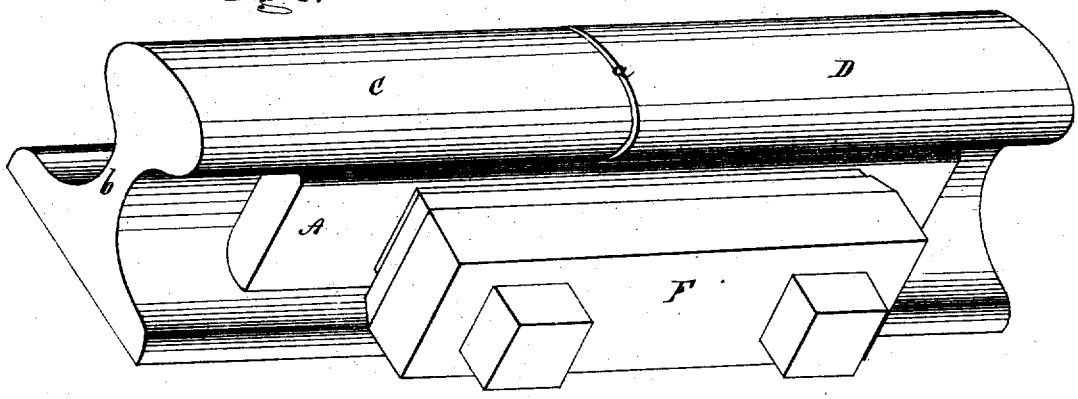

Figure 1 of the drawings represents a rail-joint with my improvement applied thereto. Fig. 2 is a cross-section in line *x x* of Fig. 3; Fig. 3, a horizontal section on the line *y y* of Fig. 2.

In the drawings, letters A B represent fish-plates or splice-pieces, applied to either side of the rail-joint *a*, made of metal, and fitting as near as may be to the web or neck of the rails, and abutting upon the head and flanges of the same. Said fish-plates or splice-pieces overlap the rails sufficiently to allow them to be bolted thereto, with the other devices hereinafter described. C and D represent the two rails. F represents a cast-iron or metallic box or cup; H, a strip of rubber or other elastic packing. G is a metallic or wooden follower. E are bolts passing through these several devices and the rails into the splice-piece or fish-plate B on the opposite side of the rail, which bolts screw into such splice or plate, as seen in Figs. 2 and 3.

It will be seen from the drawings that when the bolts E E are screwed up tightly the rubber or elastic material will become compressed, operating as a spring and tending to resist the jarring motion of the rails at the time of transit over them of the car or locomotive, as well as the strain upon the bolts. This spring or yielding of the rubber or of any elastic substance prevents also the turning or loosening of the bolts or screws.

It is obvious from the inspection of the drawings that the same construction and application of devices may be made to both sides of the rail.

It will also be apparent that the position of the follower and rubber may be reversed, so that the rubber may be in contact with the fish-plate G, or the follower may be entirely omitted and the rubber made of sufficient thickness to more than fill up the depression made in the box or cup F, so as to abut directly upon the fish-plate G, the thickness being sufficient to allow for the natural compression of the rubber, and to prevent the cup, box, or plate F and fish-plate G from coming in contact with each other.

It is also apparent that the position of the several devices herein described may be reversed and applied to the rails, and operate upon exactly the same principle and produce substantially the same results—viz., the box cup or plate F may be used as the fish-plate, with the rubber H, follower G, and the splice A occupying the position of the box or cup F, the whole being connected to the rails by means of bolts and screws in the same manner as is shown in the drawings. The box or cup F operates as a metallic washer or plate between the head of the bolt E and the rubber or elastic material H, so that the latter can in no event be injured, twisted, or its position changed or affected by the turning of the bolt or screws, and also prevents the undue expansion of the rubber or other elastic material when compressed by screwing up the bolts.

What I claim as my invention, and desire to secure by Letters Patent, is—

1. The construction and arrangement of boxes or cups, recessed to admit of the reception of rubber or other elastic packing, in combination with fish-plates applied to railroad-rail joints, and the bolts passing through said boxes or cups, in the manner and for the purpose herein described.

2. The combination of the box or cup F, elastic packing H, follower G, with the fish-plates or splice-pieces A B, the bolts E, and rails C D, in the manner and for the purpose herein described.

3. The arrangement, substantially as herein described, to secure splice-pieces or fish-plates to the joints of railroad-rails by means of boxes, cups, or plates, interposed strips of rubber or other elastic material, and follower and bolts, for the purposes set forth.

LYMAN FAY.

Witnesses:
ADAM THAYER,
H. C. RICE.